(12) United States Patent
Chik et al.

(10) Patent No.: US 7,064,758 B2
(45) Date of Patent: Jun. 20, 2006

(54) SYSTEM AND METHOD OF CACHING GLYPHS FOR DISPLAY BY A REMOTE TERMINAL

(75) Inventors: Joy P. L. Chik, Bellevue, WA (US); John E. Parsons, Redmond, WA (US); Brian M. Tallman, Arlington, WA (US)

(73) Assignee: Microsoft Corporation, Redmond, WA (US)

(*) Notice: Subject to any disclaimer, the term of this patent is extended or adjusted under 35 U.S.C. 154(b) by 156 days.

(21) Appl. No.: 10/675,480

(22) Filed: Sep. 30, 2003

(65) Prior Publication Data

US 2004/0061703 A1    Apr. 1, 2004

Related U.S. Application Data

(63) Continuation of application No. 09/329,163, filed on Jun. 9, 1999, now Pat. No. 6,657,625.

(51) Int. Cl.
G06T 11/00     (2006.01)

(52) U.S. Cl. .......................................... 345/467
(58) Field of Classification Search ................ 345/476, 345/467
See application file for complete search history.

(56) References Cited

U.S. PATENT DOCUMENTS

| | | | | |
|---|---|---|---|---|
| 5,586,241 A | * | 12/1996 | Bauermeister et al. ...... | 345/467 |
| 5,883,640 A | * | 3/1999 | Hsieh et al. ................. | 345/503 |
| 6,356,268 B1 | * | 3/2002 | Beaman et al. ............. | 345/467 |
| 6,483,918 B1 | | 11/2002 | Venkatesan et al. | |
| 6,570,988 B1 | | 5/2003 | Venkatesan et al. | |
| 6,657,625 B1 | | 12/2003 | Chik et al. | |

OTHER PUBLICATIONS

Fbufs: a high-bandwidth cross-domain transfer facility Peter Druschel, Larry L. Peterson Dec. 1993.*
Glyphs: flyweight objects for user interfaces Paul R. Calder, Mark A. Linton Aug. 1990.*

(Continued)

*Primary Examiner*—Kee M. Tung
*Assistant Examiner*—J. Amini
(74) *Attorney, Agent, or Firm*—Lee & Hayes PLLC (57) ABSTRACT

A method and system of operating a remote terminal by a terminal server caches representation data of glyphs to be displayed on the remote terminal to reduce the amount of glyph data that have to be transmitted to the remote terminal through a network connection. The glyph caching is performed on a level of text fragments each of which includes a plurality of glyphs. The remote terminal stores a fragment cache for caching fragments and glyph caches for caching individual glyphs. Each entry in the fragment cache contains data indicating where the glyph data for the glyphs of the fragment are stored in the glyph caches. When the terminal server receives a request to display a text fragment on the remote terminal, it checks whether that fragment is cached at the remote terminal. If so, the terminal server sends a fragment index to the client identifying the entry in the fragment cache for that fragment. The terminal client retrieves the information in the fragment cache entry and then retrieves the glyph data for the glyphs of the fragment from the glyph cache, and displays them on the remote terminal.

11 Claims, 8 Drawing Sheets

OTHER PUBLICATIONS

Parallel texture caching Homan Igehy, Matthew Eldridge, Pat Hanrahan, Jul. 1999.*

Prefetching in a texture cache architecture Homan Igehy, Matthew Eldridge, Kekoa Proudfoot, Aug. 1998.*

*Optimizing Applications for Windows NT "Hydra,"* Microsoft Corporation, 1997.

*Microsoft Windows NT Server, Terminal Server Edition, version 4.0: An Architectural Overview,* Microsoft Corporation, 1998.

*Microsoft Windows NT "Hydra": The Benefits of Windows with the Low Cost of a Terminal,* Microsoft Corporation, 1997.

* cited by examiner

SYSTEM AND METHOD OF CACHING GLYPHS FOR DISPLAY BY A REMOTE TERMINAL

RELATED APPLICATIONS

This application is a continuation of application Ser. No. 09/329,163 filed Jun. 9, 1999 now U.S. Pat. No. 6,657,625.

TECHNICAL FIELD OF THE INVENTION

This invention relates generally to remote terminal service in which a client computer functions as a remote terminal for a server computer, and more particularly to the display of graphic user interface by the client computer in a remote terminal session.

BACKGROUND OF THE INVENTION

Before the advent of personal computers, large, expensive, mainframe computers dominated the landscape of digital computing. Each mainframe computer typically served multiple users that interfaced with the mainframe computer through terminals that had a display device, such as a cathode-ray tube (CRT) screen, and an input device, such as a keyboard. Such terminals are nowadays commonly referred to as "dumb terminals" because they performed only basic display and input functions and had at most some rudimental digital processing capability that was not sufficient for independently running software applications.

The display provided by the "dumb" terminals was character-based, i.e., the display comprised alphanumeric letters. During operation, the user input entered through the keyboard is transmitted to the mainframe computer, and the output in the form of letters and numbers was sent to the terminal and displayed on its screen for viewing by the user.

In the beginning of the age of personal computers, personal computers were small machines with limited computing power and resources. They typically operated as individual units in the sense that each computer had its own operating system, ran its own software applications, received user input from its own input devices, and sent the user interface to its own CRT for display. In the early days, the PC interface was, like the dumb terminals for mainframes, based on alphanumeric characters. Graphic user interface, however, soon replaced the character-based display and became the norm for software applications designed to run on personal computers and networks based on personal computers.

Over time, the computing power of personal computers in terms of both hardware capabilities and software sophistication has increased tremendously. Many personal computers nowadays possess computing power and resources rivaling some small mainframe computers in the past. At the same time, networking of personal computers has become prevalent at workplaces. Due to these developments, there arises the possibility to run a software application on a server computer, which may be a network server, with the user running the application sitting at a remote client computer connected to the server computer through a network. In the capacity of a remote terminal, the client computer functions like a dumb terminal of the old days in that it forwards the user input to the server computer for processing and displays the user interface received from the server computer on its screen for viewing by the user. In a proposed scheme for remote terminal service, the client computer functions entirely in a slave mode in that the server computer tells the client computer exactly what to put on the user interface screen.

There are, however, many differences between a client computer functioning as a remote terminal and a dumb terminal of the past. One of the major differences is that the user interface has become much more sophisticated. A user interface screen on current personal computers is graphics-oriented and includes various graphic components such as text strings, icons, windows, etc. To enable the remote terminal to display the interface screen, the terminal server has to pass data regarding each graphic component, such as their bitmaps and coordinates, to the client computer. Because the remote terminal is connected to the server computer through a network, the data transmission can be quite time consuming, and the efficient use of the network bandwidth has to be considered in designing the remote terminal service system. If the amount of graphics data that have to be sent to the remote terminal is large, the network data transmission can become a bottleneck and negatively impacts the display performance of the remote terminal.

The efficient use of network bandwidth in a remote terminal session is especially import for displaying characters. An interface screen may contain many text strings each having multiple characters. Generally, each character has a Unicode designation, and the graphics engine of the client computer can use the Unicode designation and the font information of a character to render it for display. Thus, the server computer may instruct the client computer to display a text string by sending only the Unicode designations and font of the characters in the string to the client computer. This approach, however, does not work in many cases. In the remote terminal server-client scheme, the server and the client may be on different operating system platforms, and the client may not even have the set of fonts that the server has. As a result, the same characters may be rendered differently by the different graphics engines, and the remote terminal may display characters in a form different from what is intended by the server. One solution to avoid this problem is to send glyphs for the characters to be displayed to the terminal client. Each glyph contains the bitmap representation of a character of a given font and size. Sending the glyphs across the network, however, can be quite expensive. A single glyph may be over 256 bytes long. When the user interface screen to be displayed at the remote terminal contains many characters, sending the glyphs to the terminal client may take up a significant portion of network bandwidth.

SUMMARY OF THE INVENTION

In view of the foregoing, the present invention provides a method and system of caching graphic representation data of glyphs to be displayed by a remote terminal that significantly reduces the amount of glyph data that have to be transmitted through the network to the remote terminal. In accordance with the invention, the glyph data caching is performed on the level of "fragments," each fragment containing a plurality of glyphs. A fragment may represent, for example, icon text, menu text, a text string in a document, etc., to be drawn on the remote terminal. In a typical remote terminal session, many fragments are drawn on the remote terminal multiple times due to screen refresh or other reasons, and caching those fragments avoids the need to resend all the glyph data for the fragments across the network to the remote terminal.

To provide fragment caching, the terminal client stores a fragment cache for storing data representing fragments. The client also stores glyph caches for caching the bitmap representations of individual glyphs. The fragment cache and the glyph caches are maintained by a terminal server module of the server computer. Each entry in the fragment cache represents a fragment and contains data indicating where the glyph data for the glyphs in the fragment are stored in the glyph caches. When the remote terminal server receives a request to display a fragment on the remote terminal, it checks whether the fragment has been cached. If so, the terminal server sends the terminal client a fragment index that identifies the fragment cache entry for the fragment. The client then uses the data in that fragment cache entry to retrieve the data for the glyphs of the fragment from the glyph caches and render them on the display screen.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
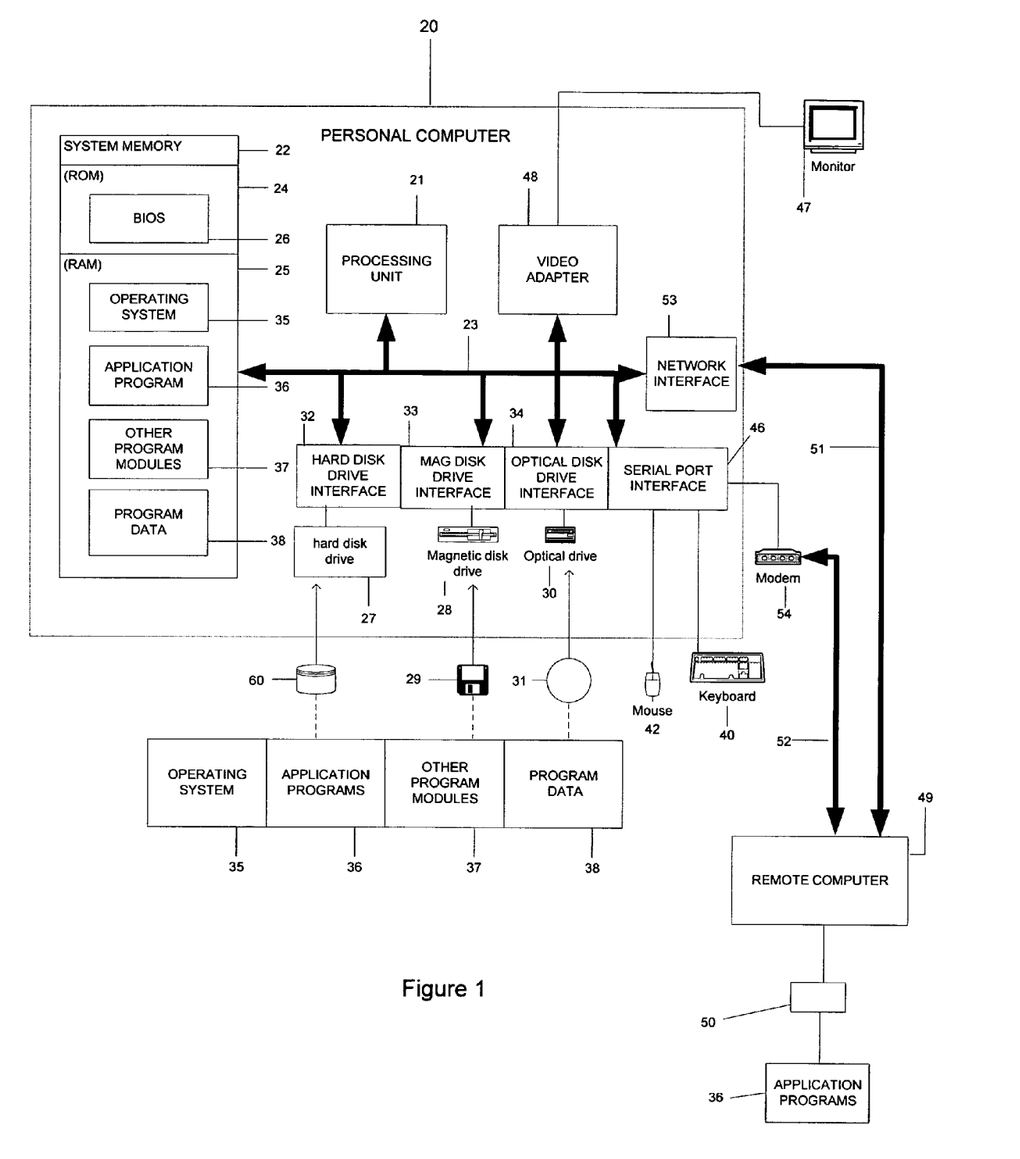
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
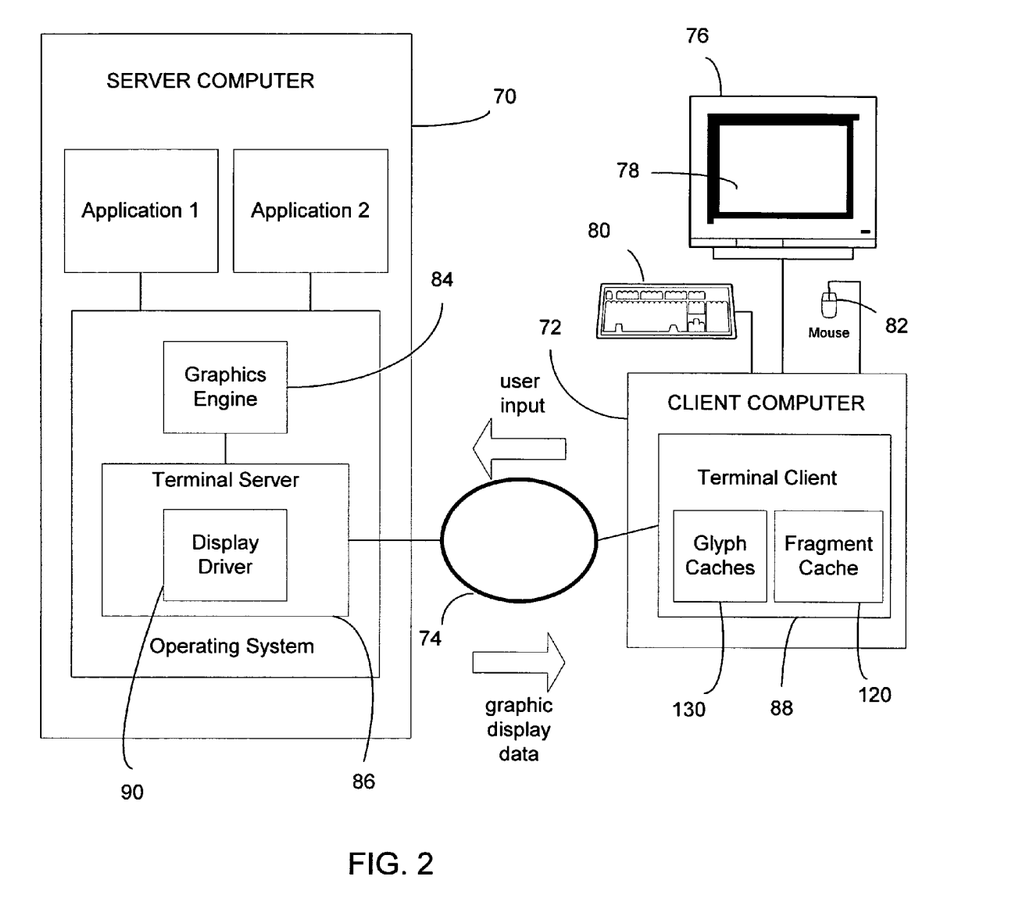
FIG. 2 is a schematic diagram showing a system for remote terminal service that includes a terminal server and a terminal client connected by a network.

Referring now to FIG. 2, the present invention is directed to an efficient way to operate a remote terminal to display characters on a graphic user interface screen. The remote terminal service system as illustrated in FIG. 2 includes a server computer 70 and a client computer 72 that communicate with each other across a network 74. The client computer 72 serves the function of a remote terminal of the server computer for interfacing with a user. To that end, the client computer 72 includes a display device 76, such as a computer monitor, with a display screen 78 for displaying graphic user interface features for viewing by the user. The client computer 72 also has one or more input devices, such as a keyboard 80 and a mouse 82, for use by the user to enter commands or data.

The client computer 72 functions as a "remote terminal" in the sense that the user actually works with the operating system and/or software applications residing on the server computer 70, and the client computer provides the input and output functionality for the server computer at a location remote from the server computer. The server computer 70 tells the client computer 72 what to display on the screen 78, and the input entered by the user through the client computer is transmitted to the server computer for processing thereby. This arrangement enables the user to use the operating system and application features and resources of the server computer 70 while placing minimal requirements on the capabilities and resources of the client computer 72.

In the embodiment illustrated in FIG. 2, the server computer 70 has an operating system that includes a graphics engine 84 and a terminal server module 86. On the other side, the client computer 72 functioning as the remote terminal has a terminal client module 88 that communicates with the terminal server 86 to provide the remote terminal service. When the operating system or an application running on the server computer 70 generates a graphic user interface (GUI) component to be displayed on the remote terminal screen 78, the graphics engine 84 sends a drawing request to the terminal server 86. The GUI component may be one of many different types of graphic interface elements, such as a text string, an icon, a window, graphic control features such as menu items or control buttons, etc. The terminal server 86 has a display driver 90 that interprets the drawing request and sends graphic display data to be drawing on the display screen 78 of the client computer. The display data are sent across the network 74 to the terminal client 88, which then interacts with the operating system of the client computer 72 to draw the GUI component on the display screen 78.

Figure 3:
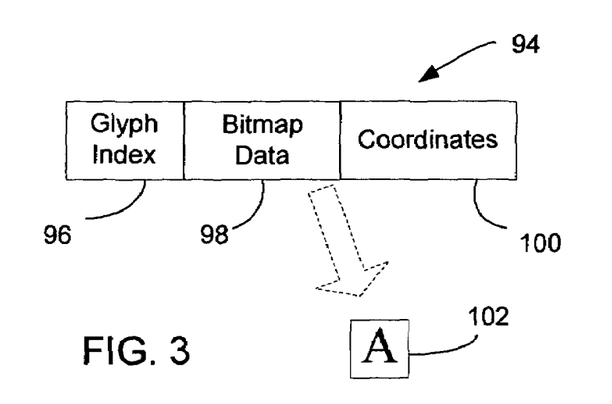
FIG. 3 is a schematic diagram showing a data structure of a glyph for a character to be displayed on a display screen of the client computer.

As described above, to ensure that the characters shown on the display screen 78 of the client computer have the shapes and forms intended by the server computer, the display driver 90 has to provide glyph data for each character to be displayed to the client computer. A glyph 94, as shown in FIG. 3, includes a glyph index 96 that identifies the character represented by the glyph, glyph definition data 98, and its coordinates 100 that identify where the glyph is to be displayed on the remote terminal screen. The glyph definition data provides a bitmap representation of the character and its font information. For example, FIG. 3 shows the letter "A" 102 in the Times New Roman font and of size 24. For each character, there is one glyph for each font and size. For example, the glyph representing the character "A" 102 in Times New Roman is different from the glyph for the character "A" in Arial. Depending on the size and font of the character, each glyph can be over 256 bytes long. If the terminal server 86 has to send the glyph data for each of the characters to be displayed on the remote display 78, the amount of data that has to be sent across the network can be rather substantial.

The present invention provides an efficient way to send glyph-related data to the client computer 72 for displaying characters on the display screen 78. Specifically, the amount of glyph data that have to be sent to the client computer is significantly reduced by the use of caching for individual glyphs and fragments in accordance with the invention. A "fragment" as used herein means a plurality of glyphs representing the characters in a text string. The present invention takes advantage of the fact that many drawing requests for displaying characters are directed to fragments rather than individual characters. During a terminal service session, some text strings, which may be desktop icon text, menu text, etc., are to be drawn on the display screen more than once due to screen refresh or other reasons. The glyph data for the text string does not have to be sent again to the terminal client 88 if they are already cached in the memory of the client computer.

Figure 4:
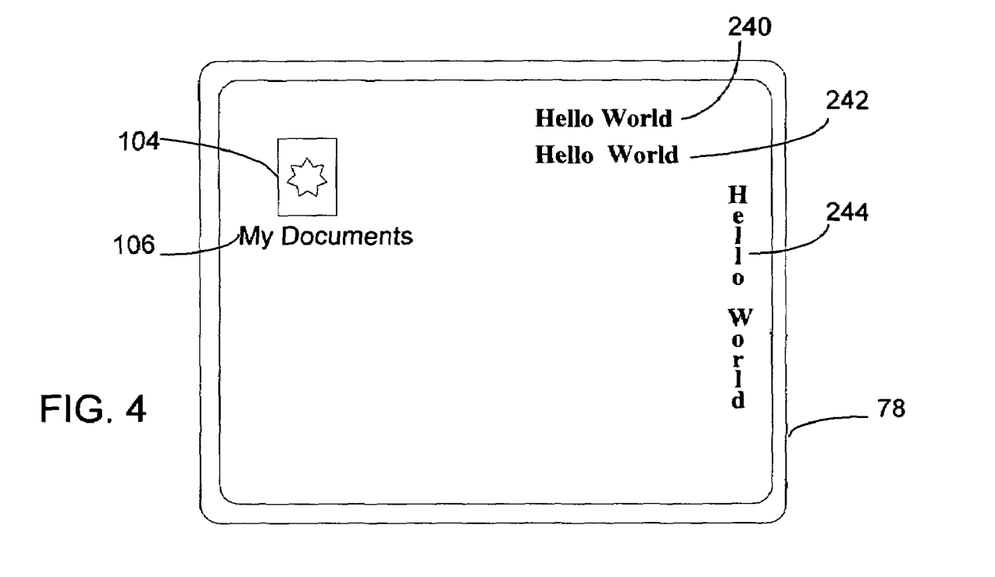
FIG. 4 is a schematic diagram of an interface screen on a remote terminal showing examples of the display of text fragments.
Figure 5A:
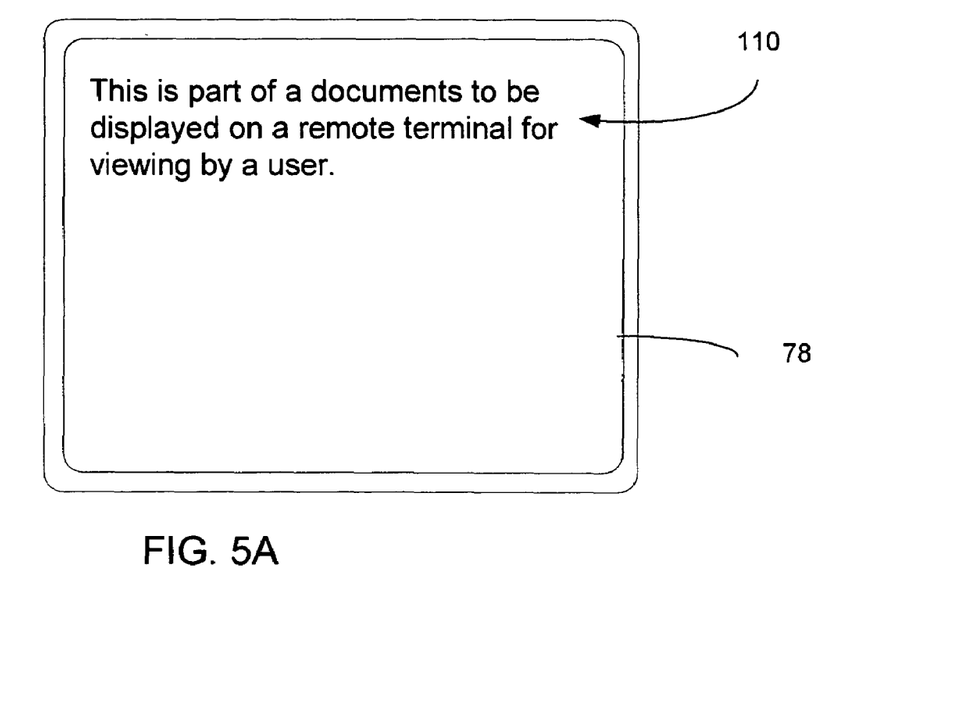
FIGS. 5A and 5B are schematic diagrams of another interface screen on the remote terminal showing another example of text fragments displayed by the remote terminal.
Figure 5B:
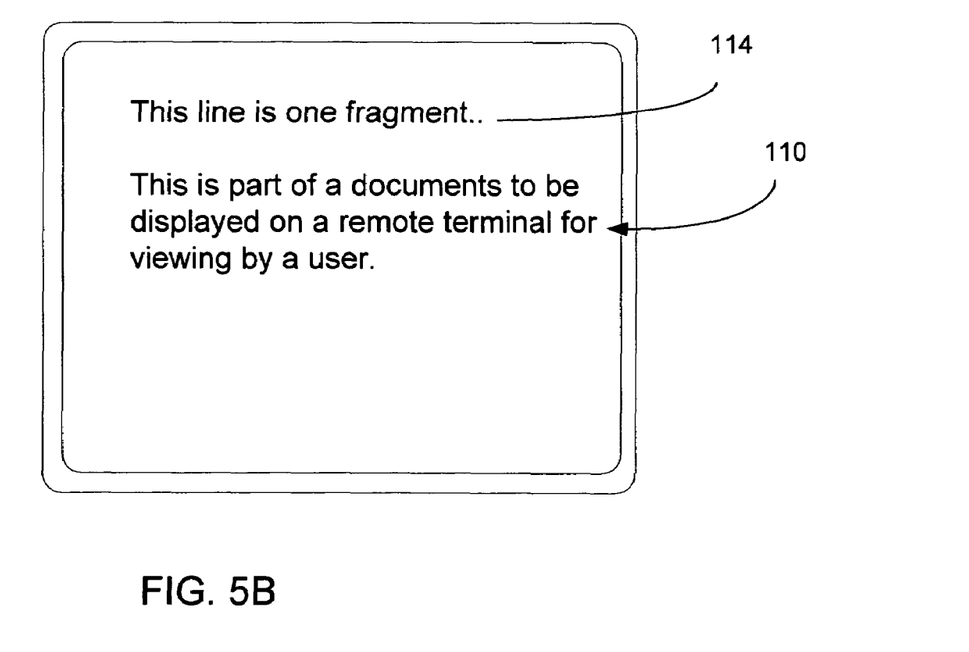

By way of example, FIGS. 4 and 5A–B show two cases in which fragments are shown on the display screen 78 of the remote terminal 72. In FIG. 4, an icon 104 and its name 106 are drawn on the display 78, which may be showing a "desktop" view displayed by the operating system of the server computer. The name 106 of the icon 104 constitutes one fragment. To display the icon name, the graphics engine of the server computer is likely to send a request to the terminal server to draw the entire name, or fragment, instead of sending multiple requests to draw one character at a time.

As another example of the display fragments, FIGS. 5A and 5B show a user interface screen 108 showing a portion of a document with multiple lines of text 110. In this case, the user may be using a word processing application running on the server computer 70 to edit the document. When the user scrolls up and down the document, different lines of the document are shown on the screen. For example, FIG. 5B shows a line 114 of text that becomes visible when the user scrolls up from the view of FIG. 5A. In this case, the graphics engine of the server computer is likely to instruct the terminal server to draw the entire line 114 at once rather than one character a time. Because many of the drawing requests concern fragments, performing caching on the glyph data on the basis of fragments effectively minimizes the amount of glyph data that have to be sent to the client computer for rendering a fragment on the display screen.

It will be appreciated, however, there are also many instances where the graphics engine will request the terminal server 86 to draw a single character at a time. For example, when the user types in new text using the keyboard of the client computer, each keystroke is sent to the server computer. The word processing application then responds through the graphics engine with a drawing request to draw the character corresponding to the keystroke on the display screen.

Figure 6:
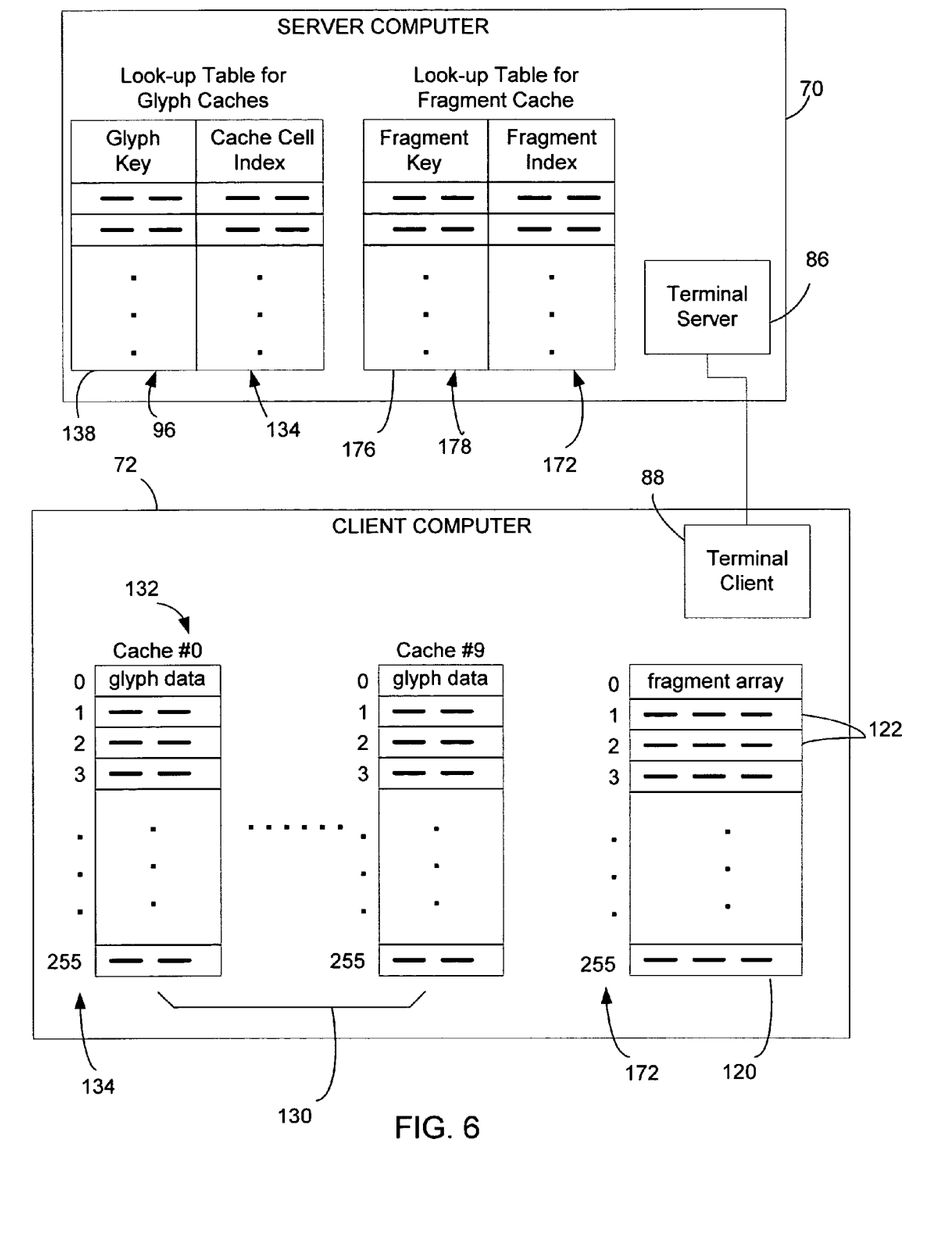
FIG. 6 is a schematic diagram of an embodiment of a caching scheme that provides caching of glyph data on the basis of text fragments.

Turning now to FIG. 6, in a preferred embodiment of the fragment caching in accordance with the invention, the client computer 72 maintains a fragment cache 120 with multiple entries 122 each of which represents one fragment. As will be described in greater detail below, the fragment caching is implemented on top of a glyph-caching scheme that caches individual glyphs. Accordingly, the following description discusses first the glyph-caching scheme, and then discusses how glyph caching is utilized in the fragment caching in accordance with the invention.

Figure 7:
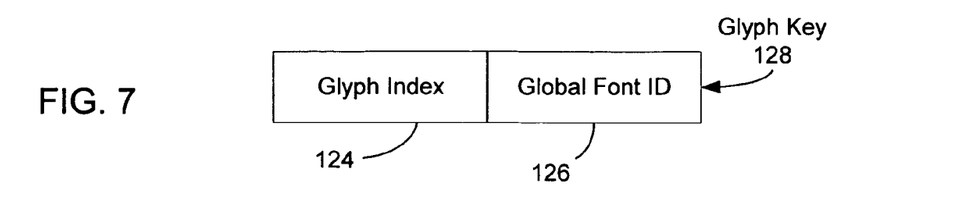
FIG. 7 is a schematic diagram showing the construction of a glyph key for identifying a glyph used in glyph data caching.

To identify the various glyphs for the purpose of caching individual glyphs, each glyph is assigned a glyph key that uniquely identifies the glyph. In a preferred embodiment, each glyph contains a glyph index that is 32-bit long. The glyph index is assigned by the graphics engine 84, and its value is unique during the lifetime of the running system. Each glyph also includes a global font ID that is also 32-bit long and identifies the font of the glyph. As shown in FIG. 7, the font ID 126 and the glyph index 124 of a character are combined to form a 64-bit glyph key 128 that uniquely identifies the glyph.

To provide glyph caching, the client computer 72 stores one or more glyph caches 130. Although the glyph caches 130 are stored in the local memory of the client computer 72, they are maintained by the server computer 70, i.e., the server computer tells the client computer where to store data for individual glyphs in the glyph caches. In a preferred embodiment, the client computer 72 has ten (10) glyph caches 130 stored thereon. Each glyph cache has a cache ID 132 numbered 0 through 9, and 256 entries (which are called "cells") each storing the bitmap data for one glyph. The glyphs in each glyph cache are identified by their respective cell indices 134. Each cell index is an 8-bit value to cover the range of 0 to 255.

The glyph caches 130 preferably have different cell lengths for storing glyphs of different sizes. This enables efficient use of the memory space of the client computer. For example, a glyph cache with a cell size of 4 bytes can be used to store a small glyph, while a cache with a cell size of 256 bytes can be used to store a much larger glyph. The glyph-cache sizes preferably are configurable, such as by using a registry of the client computer, to optimize the use of the memory space. The size of the largest glyph of a font determines which glyph cache will be used to store the glyphs of that font. Thus, all glyphs of the same font are stored in the same glyph cache, but one glyph cache can hold glyphs of multiple fonts.

In accordance with an aspect of the invention, the terminal server 86 maintains the glyph caches 130 stored by the terminal client. To keep track of which glyphs are in the glyph caches, the terminal server stores a glyph look-up table 138. Each entry in the glyph look-up 138 table corresponds to one cached glyph and stores the glyph key 96 of the glyph and the cell ID 132 and cell index 134 of the glyph cache cell in which the glyph data are stored.

Figure 8:
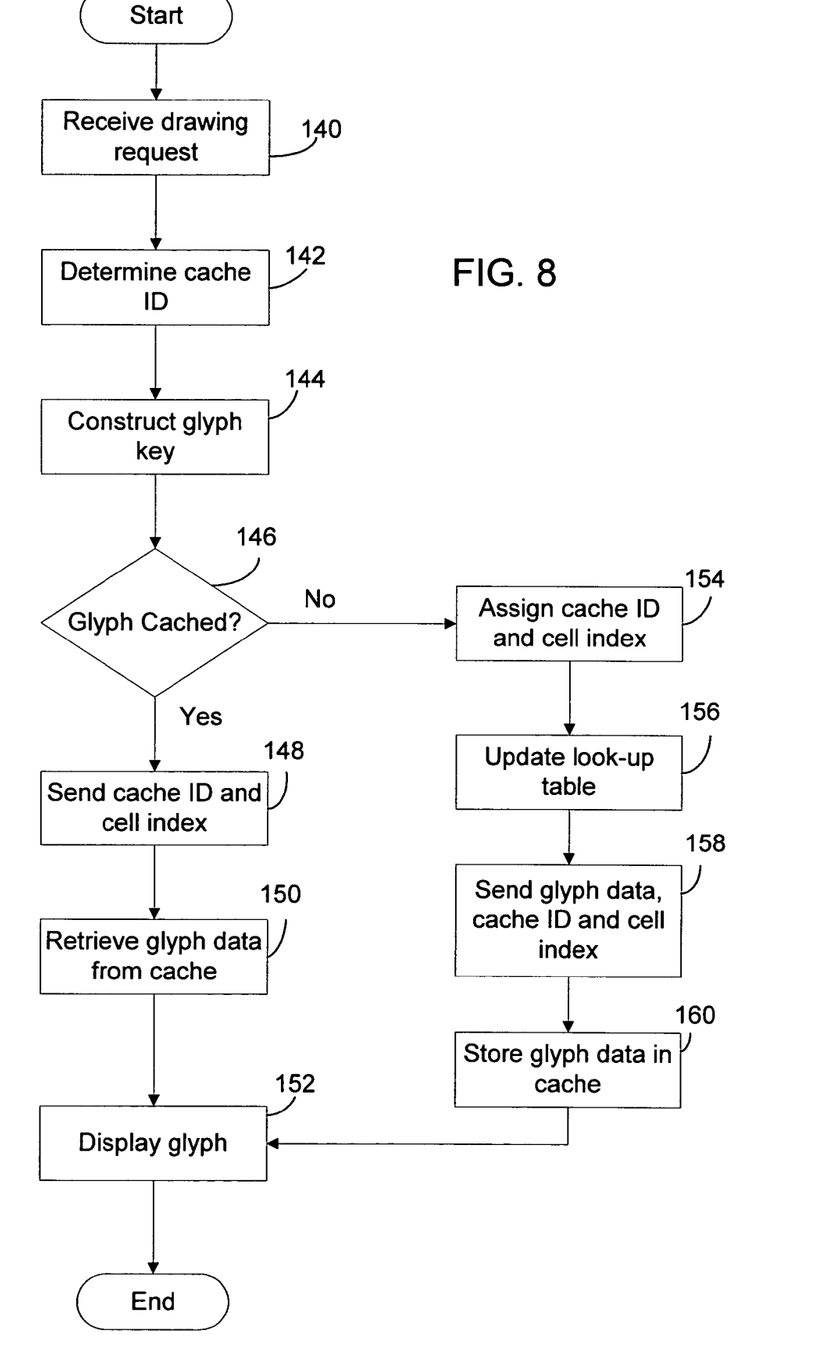
FIG. 8 is a flowchart showing steps of a glyph data caching scheme.

FIG. 8 illustrates the use of the glyph caches 130 for drawing a character on the display screen of the client computer. When the display driver of the remote terminal server receives a drawing request for a character (step 140), it determines the cache ID of the glyph based on the font ID of the character to be drawn (step 142). The server uses the font ID and the glyph index to form the unique glyph key of the glyph (step 144). The terminal server then checks whether the glyph look-up table contains an entry with this glyph key (step 146). If so, this glyph has been cached on the client computer. The terminal server then sends only the cache ID and cell index for the cached glyph to the client (step 148). The client uses the cache ID and cell index values sent by the server to find the corresponding glyph bitmaps in its local glyph caches (step 150), and displays the glyph on the display screen step 152).

On the other hand, if the server cannot find the glyph index in the look-up table, the glyph has not been cached. In this case, it assigns a cache ID and cache-cell index value to the glyph (step 154), and stores the glyph key, cache ID, and cell index in an entry of the look-up table (step 156). The server then sends the glyph bitmap and its cache ID and cell index across the network to the terminal client (step 158). The client stores the received glyph bitmap in the glyph cache and cell specified by the terminal server (step 160). The client then displays the character on the display screen (step 152). Because it is the terminal server that determines where to store each glyph in the glyph caches, it can keep track of which glyphs are cached and where to find them later.

Returning now to FIG. 6, the fragment caching in accordance with the invention is based on the glyph caching scheme described above but provides caching based on fragments instead of individual glyphs. To that end, the client stores a fragment cache 120 that has multiple entries, each entry corresponding to one fragment. As will be described in greater detail below, rather than storing the glyph bitmaps of all the glyphs in the fragment, the fragment cache entry contains information as to where the glyph bitmaps are stored in the glyph caches 130. In a preferred embodiment, there are 256 entries in the fragment cache, and each entry is identified by an 8-bit fragment index 172.

The data stored in each fragment cache entry 122 is hereinafter referred to as a fragment glyph array.

Like the glyph caches 130, the fragment cache 120 is also maintained by the terminal server 86. In order to keep track of the cached fragments, each fragment is assigned a fragment key that uniquely identifies it. The terminal sever 86 stores a fragment look-up table 176 that contains the fragment keys 178 and fragment indices 172 of the fragments that are cached by the client in the fragment cache 120.

The fragment key may be generated, for example, by applying a cryptographic checksum function to the fragment glyph array, and the resultant hash value is used as the fragment key. In a preferred embodiment, a very efficient cryptographic checksum technique is used to generate a 64-bit fragment key. Instead of performing a mod(M) operation as required by conventional cryptographic techniques, this cryptographic checksum technique generates the checksum by performing a relatively simple series of elementary register operations including mod $2^n$ multiplications, order manipulations, and additions. This efficient cryptographic checksum technique is described in detail in U.S. Pat. Nos. 6,570,988 and 6,483,918, entitled "A SIMPLE TECHNIQUE FOR IMPLEMENTING A CRYPTOGRAPHIC PRIMITIVE USING ELEMENTARY REGISTER OPERATIONS" and "A TECHNIQUE FOR PRODUCING A PARAMETER, SUCH AS A CHECKSUM, THROUGH A PRIMITIVE THAT USES ELEMENTARY REGISTER OPERATIONS," respectively, and both by Ramarathnam Venkatesan and Mariusz H. Jakubowski, which are hereby incorporated by reference.

Figure 9:
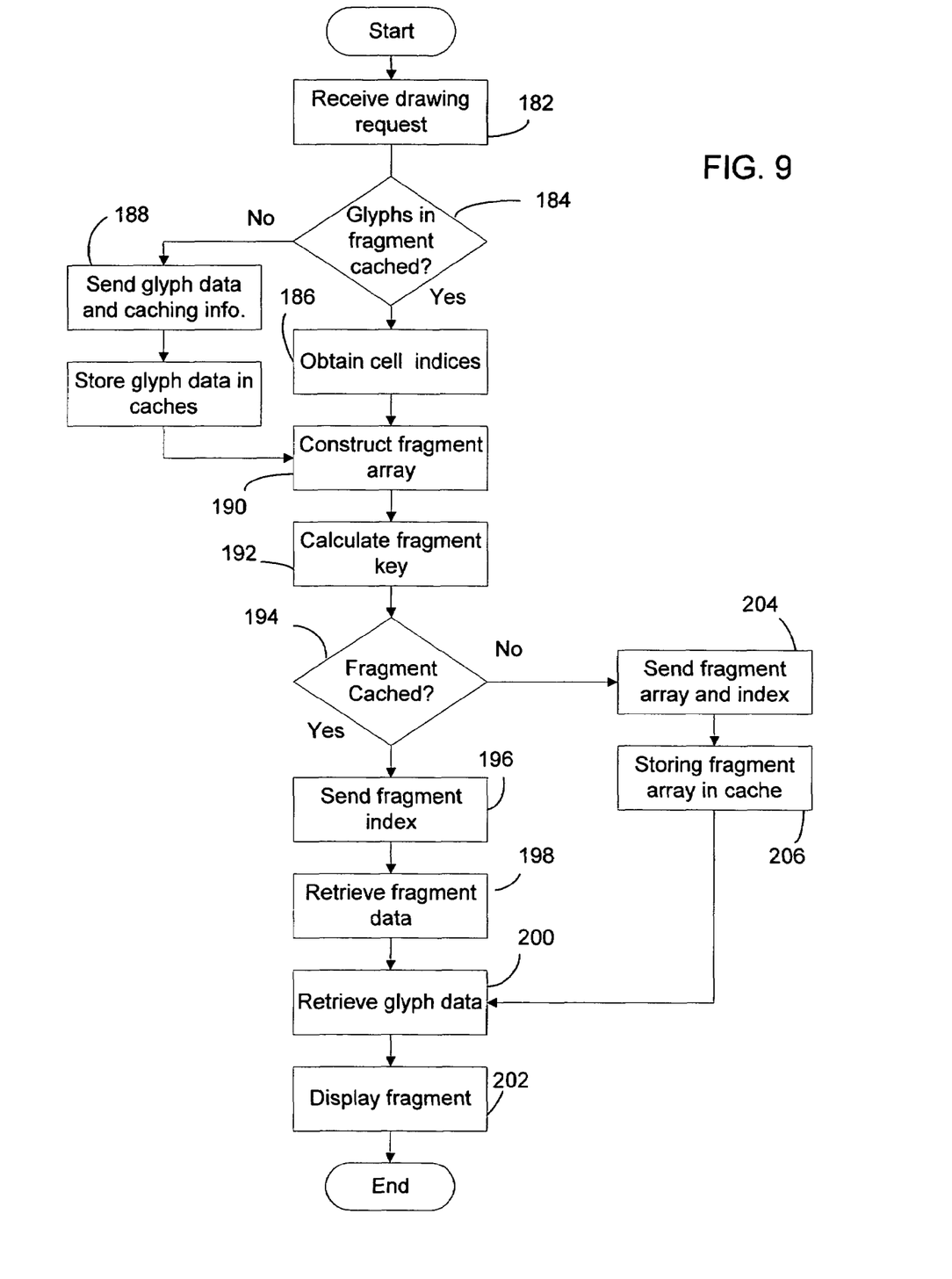
FIG. 9 is a flowchart showing steps of the fragment caching operation in an embodiment of the invention.

Turning now to FIG. 9, when the terminal server receives a drawing request for a fragment from the graphics engine (step 182), it checks whether this fragment has already been cached by terminal client. As mentioned above, the fragment caching is based on the glyph-caching scheme. Thus, when the terminal server receives the fragment to be displayed by the remote terminal, it first checks each of the glyphs in the fragment to see whether that glyph is already in the glyph cache at the client computer (step 184). As described above, this is performed by first constructing the glyph key of the glyph, and then checking whether that glyph key is in the glyph cache look-up table. If a glyph is already cached, the terminal server obtains the cache ID and cache cell index for that glyph (step 186). If a glyph in the fragment is not yet cached, the terminal server sends the glyph data and tells the client which cache cell is to be used to store the data (step 188). After determining that all glyphs in the fragment are cached, the terminal server constructs a fragment glyph array that represents the fragment in terms of the cache cell indices of the glyphs in the fragment (step 190). The terminal server then calculates the fragment key of the fragment by applying a cryptographic checksum on the fragment array (step 192), and checks the fragment look-up table to see whether there is an entry with that fragment key (step 194). If there is an entry with that fragment key, the fragment is already in the fragment cache at the client computer. The terminal server retrieves the corresponding fragment index (step 196), and sends it to the terminal client. The terminal client 88 uses the received fragment index to retrieve the fragment cache entry for this fragment (step 198). Based on the data in the fragment cache entry, the client then retrieves the glyph bitmaps of the glyphs of the fragment from the glyph caches (step 200), and draws them on the display screen (step 202).

On the other hand, if the fragment is not yet in the fragment cache, the terminal server sends to the terminal client the fragment glyph array and a fragment index identifying where the array is to be stored in the fragment cache (step 204). The terminal client stores the fragment glyph array in the entry of fragment cache corresponding to the fragment index (step 206). The terminal client then retrieves the glyph data for the fragment from the glyph caches (step 200) and displays the glyphs (step 202).

Figure 10:
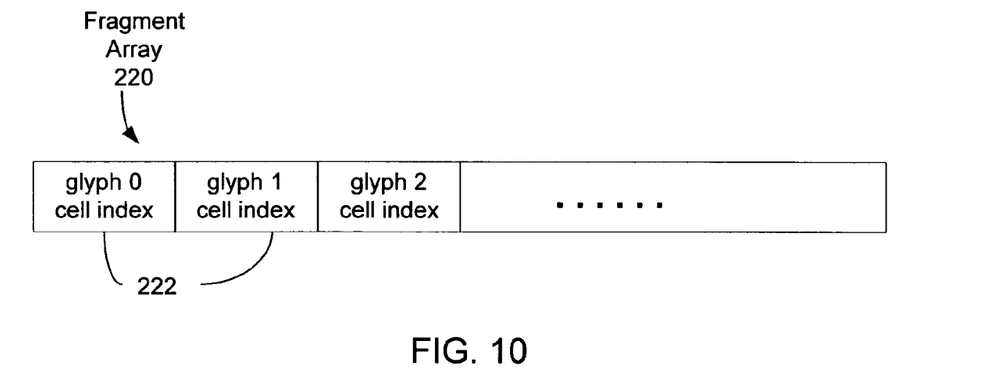
FIG. 10 is a schematic diagram of the structure of an entry of a fragment cache maintained by the terminal client.
Figure 11:
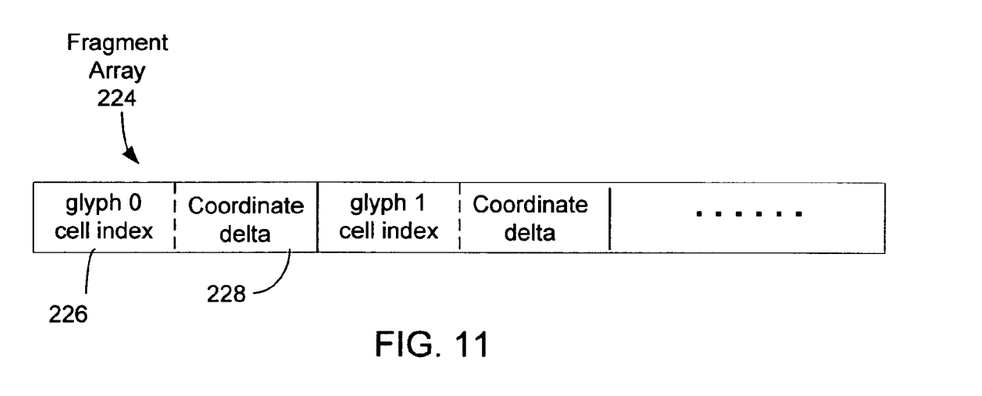
FIG. 11 is a schematic diagram of an alternative structure of an entry of the fragment cache maintained by the terminal client.

The format of a fragment glyph array may depend on various parameters. FIG. 10 shows the format used in a preferred embodiment for a fragment having fixed-width glyphs, such as those for the Courier font or other monospaced or equal-based fonts. Because the glyphs are of equal width, there is no need to specify the separation (or "coordinates delta") between them. Accordingly, the data in the fragment array 220 represent an array of glyph cache indices 222 for the glyphs in the fragment. For other fonts, such as the Times New Roman font, of uneven-width glyphs, information regarding the separations between the glyphs is needed to properly display them. FIG. 11 shows the format for such a fragment used in a preferred embodiment. A fragment array 224 contains an array of pairs of a glyph cache index 226 and a coordinate delta 228 (in either the vertical or horizontal direction). To further reduce the size of the fragment array to optimize the network-bandwidth utilization, spaces in the fragment may be treated not as an individual glyph but as part of the coordinate delta. For example, FIG. 4 shows three fragments that use identical glyphs but are presented differently on the remote terminal screen 78. The fragment "Hello World" 240 has one space between the letters "o" and "W" and therefore does not match the fragment "Hello World" 242, which has two spaces between the letters "o" and "W". The other fragment 244 is like the first fragment 240 but is rendered vertically on the screen. As described above, the space(s) separating the letters "o" and "W" in each of these fragments may be rendered by including its width in the coordinate delta for the glyph "o".

In a preferred embodiment, the fragment caching is applied to text strings that have 3 to 256 characters of a same font. Other ranges may also be used. The lower limit is imposed because a short string, such as one with only two characters, can be handled efficiently with the glyph-caching scheme without the need to utilize the fragment caching mechanism. The upper limit is imposed to prevent the size of the fragment cache entries from becoming too large. A text string with a length exceeding the upper limit can be broken into two or more shorter fragments which can fit in the entries of the fragment cache.

In view of the foregoing, it can be seen that the present invention provides an effective way to improve the performance of a remote terminal in displaying character strings by caching glyph data on the basis of text fragments. This fragment-caching scheme significantly reduces the amount of glyph data that have to be transmitted across the network to the terminal client for display on the remote terminal. The fragment caching is built upon a glyph-caching scheme for individual glyphs, and the fragment glyph arrays in the fragment cache store the glyph-cache cell indices rather than the glyph bitmaps of the glyphs in the cached fragments. This arrangement minimizes the sizes of the fragment arrays in the fragment cache, resulting in efficient use of the memory of the client computer functioning as the remote terminal.

In view of the many possible embodiments to which the principles of this invention may be applied, it should be recognized that the embodiment described herein with respect to the drawing figures is meant to be illustrative only and should not be taken as limiting the scope of invention.

For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps to communicate with a remote terminal for displaying graphic user interface images, comprising:
    receiving a drawing request to display a fragment on the remote terminal, the fragment including a plurality of glyphs;
    determining whether the fragment has been cached in a fragment cache at the remote terminal;
    sending a fragment index associated with the fragment to the remote terminal, when it is determined that the fragment has been cached, the fragment index identifying an entry in the fragment cache that stores data representing the fragment; and
    when it is determined that the fragment has not been cached:
    identifying missing glyphs of the fragment that have not been cached at the remote terminal;
    caching the missing glyphs at the remote terminal;
    determining a fragment index for the fragment, the fragment index identifying an entry in the fragment table for storing said fragment; and
    storing the fragment index on a local computer system for maintaining the fragment cache on the remote terminal.

2. A computer-readable medium as in claim 1, wherein the fragment cache is implemented using a glyph caching scheme.

3. A computer-readable medium as in claim 1, having further computer-executable instructions for performing the step of sending the fragment index to the remote terminal for caching the fragment in an entry of the fragment cache identified by the fragment index.

4. A computer-readable medium as in claim 1, wherein the determining act comprises testing the fragment cache to verify that each glyph in the fragment is stored in the fragment cache.

5. A computer-readable medium as in claim 4, further comprising:
    storing a plurality of glyph caches on the remote terminal,
    wherein the fragment cache comprises a plurality of entries each having location information identifying storage locations in the glyph caches for the glyphs of the fragment.

6. A computer readable medium as in claim 4, having further computer-executable instructions for performing the steps of identifying a glyph in the fragment that is not currently stored in the cache, sending graphic representation data for said glyph and a cell index to the remote terminal, the cell index identifying a cell in the glyph caches for storing the graphic representation data for said glyph.

7. A computer-readable medium as in claim 1, having further computer-executable instructions for performing the step of maintaining a local fragment cache identification table to identify which fragments are cached on the remote terminal.

8. A computer-readable medium as in claim 7, wherein the local fragment cache identification table stores fragment identification values comprising information identifying one or more fragment storage locations in the fragment cache at the remote terminal.

9. A computer-readable medium as in claim 8, wherein the local fragment cache identification table comprises a lookup table having fragment keys associated with fragment indices identifying corresponding entries in the fragment cache at the remote terminal.

10. A computer-readable medium as in claim 9, wherein the fragment cache is based on a glyph cache system.

11. A computer-readable medium as in claim 10, having further computer-executable instructions for performing the step of maintaining a local glyph cache lookup table for the glyph caches stored at the remote terminal, wherein the glyph cache lookup table comprises glyph keys associated with cache cell indices for identifying corresponding cells in the glyph caches.

* * * * *